(12) United States Patent
Aoki

(10) Patent No.: US 10,435,249 B2
(45) Date of Patent: Oct. 8, 2019

(54) CONVEYING DEVICE

(71) Applicant: JTEKT CORPORATION, Osaka-shi (JP)

(72) Inventor: Hiroaki Aoki, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/975,890

(22) Filed: May 10, 2018

(65) Prior Publication Data

US 2018/0339381 A1 Nov. 29, 2018

(30) Foreign Application Priority Data

May 29, 2017 (JP) ................. 2017-105612
May 29, 2017 (JP) ................. 2017-105613

(51) Int. Cl.

| B65G 25/10 | (2006.01) |
|---|---|
| B23Q 7/06 | (2006.01) |
| B23Q 41/02 | (2006.01) |
| B65G 47/82 | (2006.01) |
| B65G 35/06 | (2006.01) |
| B65G 47/88 | (2006.01) |
| B23Q 7/05 | (2006.01) |

(52) U.S. Cl.
CPC ............... *B65G 25/10* (2013.01); *B23Q 7/05* (2013.01); *B23Q 7/06* (2013.01); *B23Q 41/02* (2013.01); *B65G 35/06* (2013.01); *B65G 47/82* (2013.01); *B65G 47/8823* (2013.01)

(58) Field of Classification Search
CPC ........ B65G 25/10; B65G 35/06; B65G 47/82; B65G 47/8823; B23Q 7/05; B23Q 7/06; B23Q 41/02
See application file for complete search history.

(56) References Cited

U.S. PATENT DOCUMENTS 5,320,213 A * 6/1994 McIntosh ............... B65G 25/10
198/468.9
5,435,681 A * 7/1995 Ueda ....................... B65G 25/10
198/468.1

(Continued)

FOREIGN PATENT DOCUMENTS

| JP | 2008-80414 | 4/2008 |
|---|---|---|
| JP | 2016-83719 | 5/2016 |

*Primary Examiner* — Gene O Crawford
*Assistant Examiner* — Keith R Campbell
(74) *Attorney, Agent, or Firm* — Oblon, McClelland, Maier & Neustadt, L.L.P.

(57) ABSTRACT

A conveying device includes a workpiece pressing member and a switching member. The workpiece pressing member is able to move along a conveyance path when a mobile body moves, and also moves a workpiece downstream of the conveyance path by moving downstream of the conveyance path while pressing the workpiece. The switching member is able to move along the conveyance path as the mobile body moves, and switches between an engaged state and a non-engaged state with the workpiece pressing member depending on whether the movement is in downstream and upstream directions. When the switching member moves downstream, the workpiece pressing member is able to press the workpiece, and, when the switching member moves upstream, the workpiece pressing member is able to avoid coming into contact with the workpiece.

17 Claims, 8 Drawing Sheets

(56) References Cited

U.S. PATENT DOCUMENTS

| | | | |
|---|---|---|---|
| 6,213,285 B1 * | 4/2001 | Smith | B65G 47/32 |
| | | | 198/345.3 |
| 6,415,910 B1 * | 7/2002 | Strothmann | B23Q 7/06 |
| | | | 198/468.11 |
| 7,681,716 B2 * | 3/2010 | Kobayashi | B23P 19/001 |
| | | | 198/583 |
| 8,757,362 B2 * | 6/2014 | Ono | B65G 25/10 |
| | | | 198/465.1 |
| 9,534,842 B1 * | 1/2017 | Rivera | F26B 25/003 |

\* cited by examiner

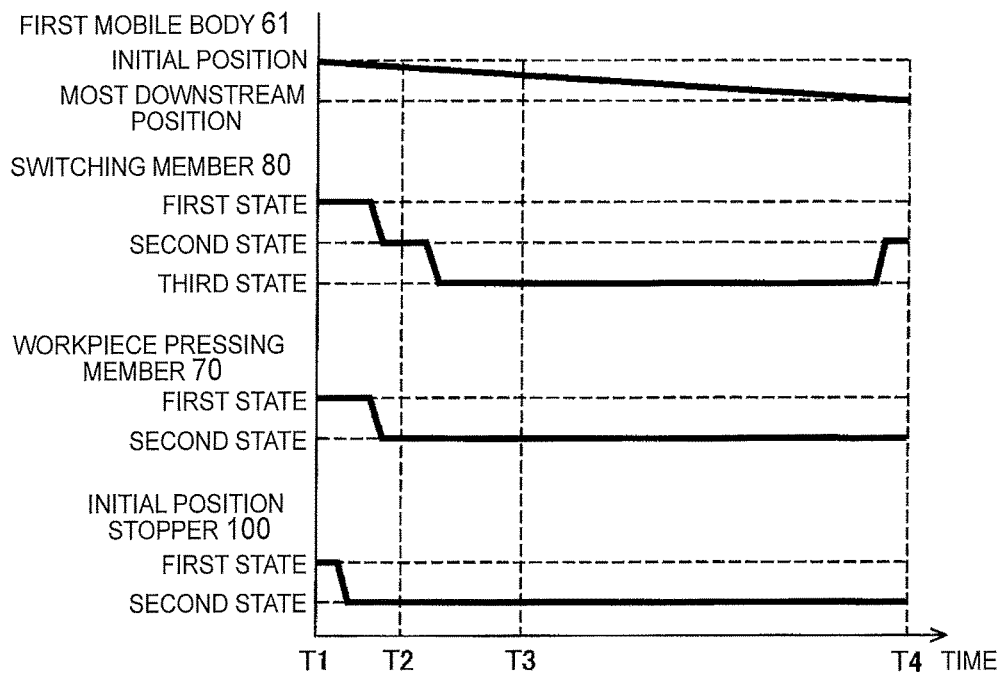
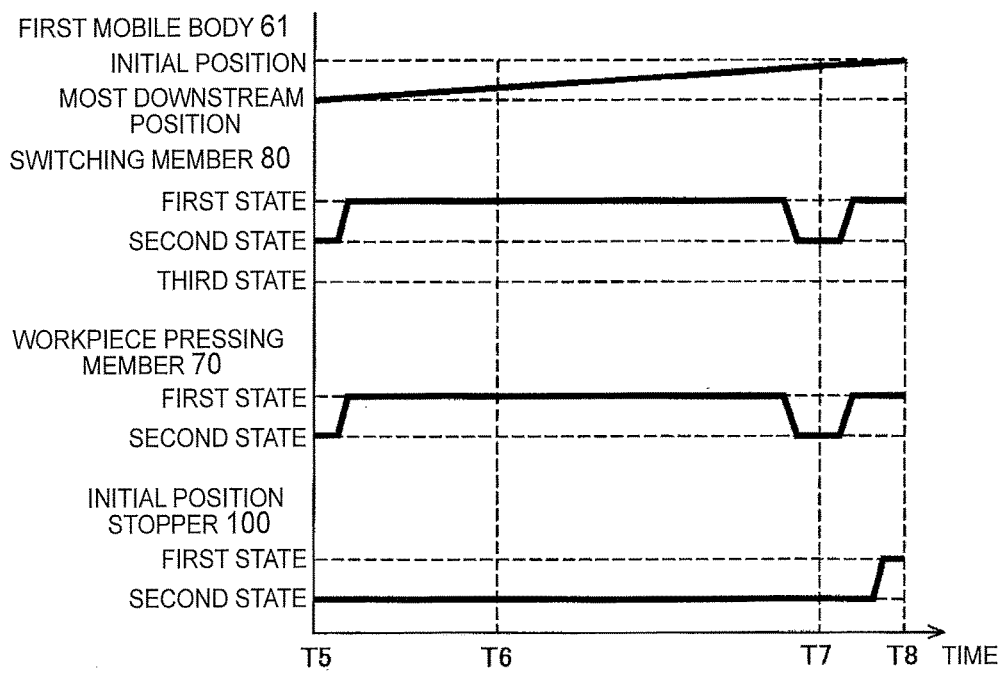

CONVEYING DEVICE

INCORPORATION BY REFERENCE

The disclosure of Japanese Patent Application No. 2017-105612 filed on May 29, 2017 and Japanese Patent Application No. 2017-105613 filed on May 29, 2017, each including the specification, drawings and abstract, is incorporated herein by reference in its entirety.

BACKGROUND

1. Technical Field

The disclosure relates to a conveying device.

2. Description of Related Art

In Japanese Unexamined Patent Application Publication No. 2016-83719 (JP 2016-83719 A), a conveying device that conveys a workpiece is described. The conveying device includes a cylinder rod and a workpiece pressing member. The cylinder rod moves along a conveyance path, and the workpiece pressing member conveys a workpiece by pressing the workpiece as the cylinder rod moves. The workpiece pressing member is made of an anti-back mechanism. Thus, when the workpiece pressing member moves downstream of the conveyance path (in a conveyance direction), rotation of the workpiece pressing member is restricted, and the workpiece pressing member is thus able to convey the workpiece while the workpiece pressing member presses the workpiece.

Meanwhile, when a workpiece is carried into an initial position on the conveyance path, the workpiece pressing member is allowed to rotate. Therefore, the workpiece is able to pass the workpiece pressing member and be carried into the initial position. Further, when the workpiece pressing member finished conveying the workpiece, and the workpiece pressing member then returns to an upstream side (in the opposite direction to the conveyance direction) of the conveyance path, the workpiece pressing member is allowed to rotate. Therefore, the workpiece pressing member is able to return to an upstream position on the conveyance path while leaving the workpiece at the conveyance position.

In Japanese Unexamined Patent Application Publication No. 2008-80414 (JP 2008-80414 A), a conveying device that conveys a workpiece is described. In the conveying device, a stopper is provided in order to position a workpiece at a given position. The stopper is driven by a cylinder device.

SUMMARY

When a workpiece is carried into an initial position, and, when a workpiece pressing member returns to its original position after conveyance of the workpiece is finished, the workpiece pressing member rotates as the workpiece pressing member comes into contact with the workpiece. However, it is desired that the workpiece pressing member does not come into contact with a workpiece unless the workpiece pressing member presses and conveys a workpiece.

In order to achieve this desired configuration, it is considered to provide an actuator dedicated for switching a position of the workpiece pressing member. However, when there is a plurality of the actuators in a conveying device, cost becomes high. When a plurality of cylinder devices is used as the actuators, there is a likelihood that the cylinder devices cannot be operated synchronously, and it is necessary to operate the cylinder devices in order. Therefore, overall operation time becomes long. Meanwhile, synchronous operation is possible when motors are used as the actuators. However, cost becomes even higher.

Cost also becomes high when a dedicated actuator is provided in order to drive a stopper that positions a workpiece at a predetermined position. Therefore, it is considered that the actuator is not used, and for example, a spring mechanism is used instead in order to switch between restriction and permission for conveyance of a workpiece. However, with the spring mechanism only, it is not easy to adjust force for restricting conveyance of a workpiece. Hence, it is required to use an actuator in order to drive the stopper.

A conveying device according to the disclosure is able to restrain a workpiece pressing member from coming into contact with a workpiece without using a plurality of actuators, unless the workpiece pressing member presses and conveys a workpiece.

Further, the disclosure provides a conveying device that is able to ensure that restriction and permission for conveyance of a workpiece at a given position is switched without using a dedicated actuator.

An aspect of the disclosure relates to a conveying device including: an actuator; a mobile body that moves along a conveyance path by drive of the actuator; a workpiece pressing member that is able to move along the conveyance path when the mobile body moves, the workpiece pressing member moving a workpiece by moving along the conveyance path in a state where the workpiece pressing member presses the workpiece; and a switching member that is able to move along the conveyance path when the mobile body moves, the switching member switching a relation between a position of the workpiece pressing member and a position of the switching member such that the relation becomes a first relation or a second relation depending on a moving direction of the mobile body; wherein: the relation becomes one of the first relation and the second relation when the switching member moves in a first direction in the conveyance path, and thus realizes a first state in which the workpiece pressing member is able to press the workpiece; and the relation becomes another one of the first relation and the second relation when the switching member moves in a second direction in the conveyance path, and thus realizes a second state in which the workpiece pressing member is able to avoid coming into contact with the workpiece.

According to the foregoing aspect, as the switching member operates, the workpiece pressing member switches between the state where the workpiece pressing member is able to press the workpiece, and the state where the workpiece pressing member is able to avoid coming into contact with the workpiece. Also, the actuator carries out the operation of the switching member, the actuator being used to move the workpiece pressing member along the conveyance path so as to convey the workpiece. This means that the actuator not only moves the workpiece pressing member so as to convey the workpiece, but also operates the switching member so that the workpiece pressing member is able to avoid coming into contact with the workpiece.

Therefore, the actuator that allows the workpiece pressing member to avoid coming into contact with the workpiece also serves as the actuator that conveys the workpiece. Hence, the conveying device according to the disclosure does not have more than one actuator, thereby reducing cost. Further, since the actuator is used for more than one purpose, a problem caused by use of a plurality of cylinder devices and motors does not happen.

Another aspect of the disclosure relates to a conveying device including: an actuator; a mobile body that moves along a conveyance path due to drive of the actuator; a workpiece pressing member that is able to move along the conveyance path when the mobile body moves, the workpiece pressing member moving along the conveyance path in a state where the workpiece pressing member presses a workpiece, and thus moving the workpiece; a fixing member provided in the conveyance path in a fixed manner; an initial position stopper that is provided in the fixing member and switches between a restricted state where conveyance of the workpiece carried into an initial position in the conveyance path is restricted, and a permitted state where conveyance of the workpiece is permitted; and a stopper switching member that is able to move along the conveyance path when the mobile body moves, the stopper switching member causing the initial position stopper to be in the restricted state when the workpiece pressing member is at an initial standby position, the stopper switching member causing the initial position stopper to be in the permitted state when the workpiece pressing member is at a position that is more downstream than the initial standby position.

According to the disclosure, the initial position stopper switches between the state where conveyance of the workpiece carried into the initial position on the conveyance path is restricted, and the state where conveyance of the workpiece is permitted. The state of the initial position stopper is switched by the stopper switching member. The stopper switching member moves as the mobile body moves, and the mobile body moves due to drive of the actuator. This means that the switching operation for the initial position stopper is performed by the actuator. Thus, the initial position stopper is able to realize reliably the state where conveyance of the workpiece carried into the initial position is restricted, and the state where conveyance of the workpiece is permitted.

Moreover, the actuator also moves the workpiece pressing member along the conveyance path. Thus, the actuator is used not only to operate the initial position stopper, but also to move the workpiece pressing member. Since no dedicated actuator is provided in the conveying device, a cost reduction is realized.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a time chart describing a conveyance method used by the second conveying device, showing a state of each part when an first mobile body is moved to a downstream side of a conveyance path;

FIG. 6 is a time chart describing a conveyance method used by the second conveying device, showing a state of each part when the first mobile body is moved to an upstream side of the conveyance path;

DETAILED DESCRIPTION OF EMBODIMENTS

1. Overall Structure of Processing Line

Figure 1:
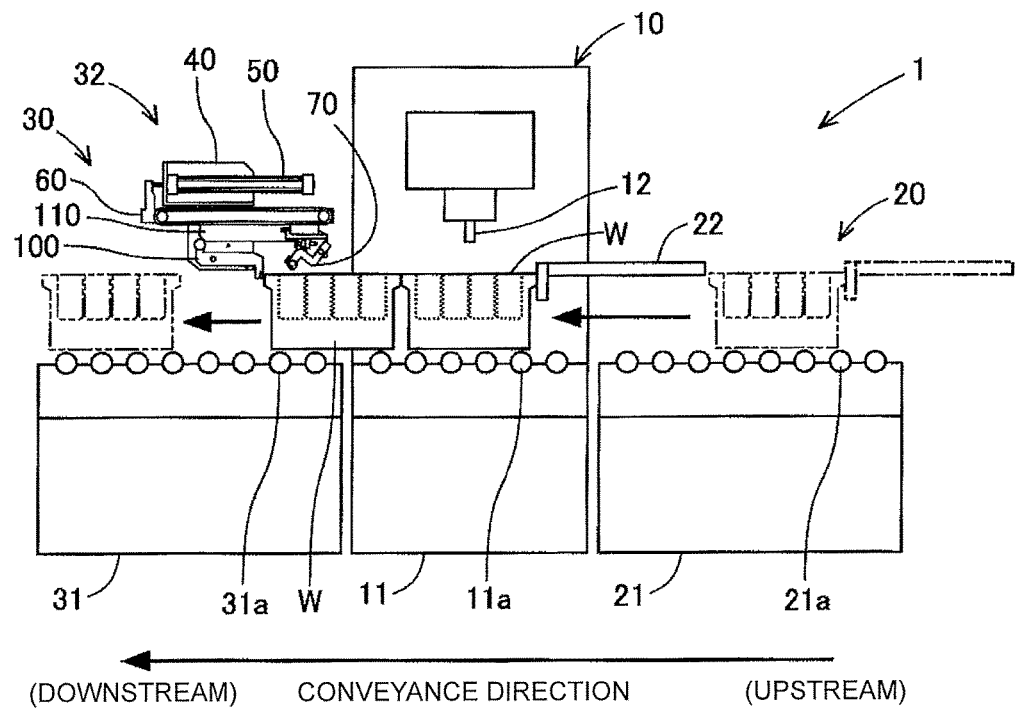
FIG. 1 is a front view of a processing line.

An overall structure of a processing line 1 is described with reference to FIG. 1. The processing line 1 is a line in which a workpiece W is conveyed and predetermined processing is performed on the workpiece W. Examples of the predetermined processing are production processing and inspection processing in which processing, assembly, and so on are performed. The processing line 1 is a production line in which the production processing is performed, an inspection line in which inspection is performed, and so on. Further, the processing line 1 includes a line where a single type of processing is performed, and a line where a plurality of types of processing is performed. Thus, the processing line 1 includes at least one processing machine 10, and conveying devices 20, 30 that convey the workpiece W to be processed by the processing machine 10.

In the embodiment, the processing line 1 includes, for example, the processing machine 10, a first conveying device 20, and a second conveying device 30. The processing machine 10 is a machine tool that cuts the workpiece W. The first conveying device 20 carries the workpiece W into the processing machine 10. The second conveying device 30 carries out the workpiece W processed by the processing machine 10. The processing line 1 may include the plurality of processing machines 10, and the plurality of second conveying devices 30. Further, the workpiece W is, for example, a cylinder block of an engine. In the cylinder block, for example, four bores are formed with a predetermined pitch.

The processing machine 10 includes a conveyance path 11 on which the workpiece W can be conveyed in a conveyance direction. The conveyance path 11 includes a plurality of rollers 11a arrayed along the conveyance direction, and the rollers 11a are able to rotate freely. The workpiece W is conveyed on an upper surface of the conveyance path 11. The conveyance path 11 includes a clamping device (not shown), and the clamping device is able to clamp the workpiece W at a predetermined position, the workpiece W being carried into the processing machine 10. The processing machine 10 includes a machining tool 12. By moving the machining tool 12 with respect to the workpiece W, the workpiece W is processed.

The first conveying device 20 is arrayed adjacent to the processing machine 10 on an upstream side (the side opposite to the conveyance direction) of the conveyance path 11. The first conveying device 20 includes a conveyance path 21 on which the workpiece W can be conveyed in the conveyance direction. The conveyance path 21 includes a plurality of rollers 21a arrayed along the conveyance direction, and the rollers 21a are able to rotate freely. The conveyance path 21 is continuous with the upstream side of the conveyance path 11 in the processing machine 10. The workpiece W is conveyed on an upper surface of the conveyance path 21.

The first conveying device 20 includes a workpiece moving device 22 that presses the workpiece W placed on the upper surface of the conveyance path 21 against the processing machine 10. In the embodiment, the workpiece moving device 22 presses a rear end surface of the workpiece W and moves the workpiece W along the conveyance paths 21, 11, thereby conveying the workpiece W to a given position in the processing machine 10.

The second conveying device 30 is arrayed adjacent to the processing machine 10 on a downstream side of the conveyance path 11 (the conveyance direction). The second conveying device 30 includes a conveyance path 31 on which the workpiece W can be conveyed in the conveyance direction. The conveyance path 31 includes a plurality of rollers 31a arrayed along the conveyance direction, and the rollers 31a are able to rotate freely. The conveyance path 31 is continuous with the downstream side of the conveyance path 11 in the processing machine 10. The workpiece W is conveyed on an upper surface of the conveyance path 31.

Here, the workpiece W processed by the processing machine 10 is pushed out to an initial position on the conveyance path 31 of the second conveying device 30 by an unprocessed workpiece W when the unprocessed workpiece W is conveyed to a predetermined position in the processing machine 10 by the workpiece moving device 22 of the first conveying device 20.

The second conveying device 30 includes a workpiece moving device 32. The workpiece moving device 32 conveys the processed workpiece W downstream of the conveyance path 31, the processed workpiece W being carried into the initial position on the conveyance path 31 from the processing machine 10. The workpiece moving device 32 is disposed above the conveyance path 31. The workpiece moving device 32 chiefly includes an actuator 50, a mobile body 60, a workpiece pressing member 70, and an initial position stopper 100. The actuator 50 is driven in a direction along the conveyance path 31. Thus, in the embodiment, the actuator 50 is an actuator with a linear motion mechanism.

The mobile body 60 moves along the conveyance path 31 by drive of the actuator 50. The workpiece pressing member 70 is able to move along the conveyance path 31 when the mobile body 60 moves, and the workpiece pressing member 70 moves downstream of the conveyance path 31 in a state where the workpiece pressing member 70 presses the workpiece W. Thus, the workpiece pressing member 70 is able to move the workpiece W downstream of the conveyance path 31.

The initial position stopper 100 switches between a state where conveyance of the workpiece W carried into the initial position on the conveyance path 31 is restricted, and a state where conveyance of the workpiece W is permitted. When the workpiece W is carried into the conveyance path 31 from the processing machine 10, the workpiece W tends to move downstream along the conveyance path 31. In such a case, the initial position stopper 100 is able to restrict the movement of the workpiece W toward downstream of the conveyance path 31 and position the workpiece W at the initial position on the conveyance path 31. Then, when the workpiece pressing member 70 moves the workpiece W downstream of the conveyance path 31, the initial position stopper 100 is switched to the state that permits conveyance of the workpiece W.

2. Detailed Structure of Workpiece Moving Device 32

A detailed structure of the workpiece moving device 32 is described with reference to FIG. 2 to FIG. 4. More specifically, the workpiece moving device 32 includes a fixing member 40, the actuator 50, the mobile body 60, the workpiece pressing member 70, a switching member 80, a guide member 90, the initial position stopper 100, and a stopper switching member 110.

The fixing member 40 is provided in the conveyance path 31 of the second conveying device 30 in a fixed manner. As shown in FIG. 2 and FIG. 4, the fixing member 40 includes a first fixing member 41, a second fixing member 42, and a third fixing member 43. The first fixing member 41 is a member that fixes an actuator body 51 of the actuator 50. As shown in FIG. 2 and FIG. 4, the first fixing member 41 includes a vertical plate-shaped member 41a, a horizontal plate-shaped member 41b, and a vertical plate-shaped member 41c. The vertical plate-shaped member 41a is orthogonal to the conveyance direction. The horizontal plate-shaped member 41b extends from a lower edge of the member 41a to upstream of the conveyance path 31. The vertical plate-shaped member 41c extends from a back edge of the member 41a to upstream of the conveyance path 31.

Figure 4:
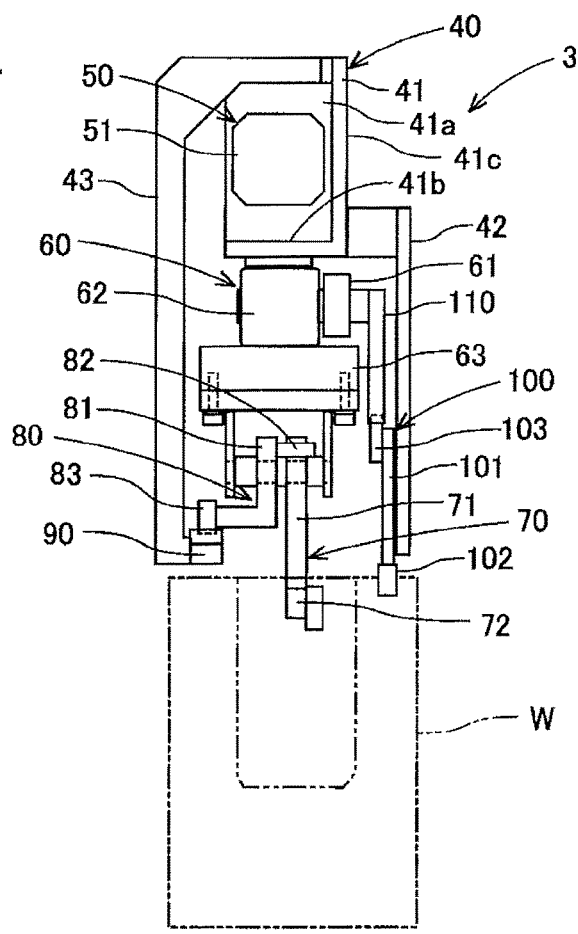
FIG. 4 is an enlarged view of a right side of the second conveying device.

As shown in FIG. 4, the second fixing member 42 is formed into a vertical plate shape, and is fixed to a back surface of the member 41b of the first fixing member 41 so that the second fixing member 42 hangs down from the first fixing member 41. A lower end of the second fixing member 42 is positioned slightly above an upper surface of the workpiece W in a state where the workpiece W is placed on the conveyance path 31.

As shown in FIG. 4, the third fixing member 43 is fixed to a front surface of the member 41b of the first fixing member 41, goes over the actuator body 51, and is fixed so as to hang down from the first fixing member 41. Similarly to the second fixing member 42, a lower end of the third fixing member 43 is positioned slightly above the upper surface of the workpiece W in the state where the workpiece W is placed on the conveyance path 31.

As described earlier, the actuator 50 is an actuator with a linear motion mechanism. As the actuator 50, for example, a hydraulic or pneumatic cylinder device may be used. However, the actuator 50 is not limited to the cylinder device, and various types of actuators with a ball screw mechanism, a linear motor mechanism, and so on may be used.

Figure 2:
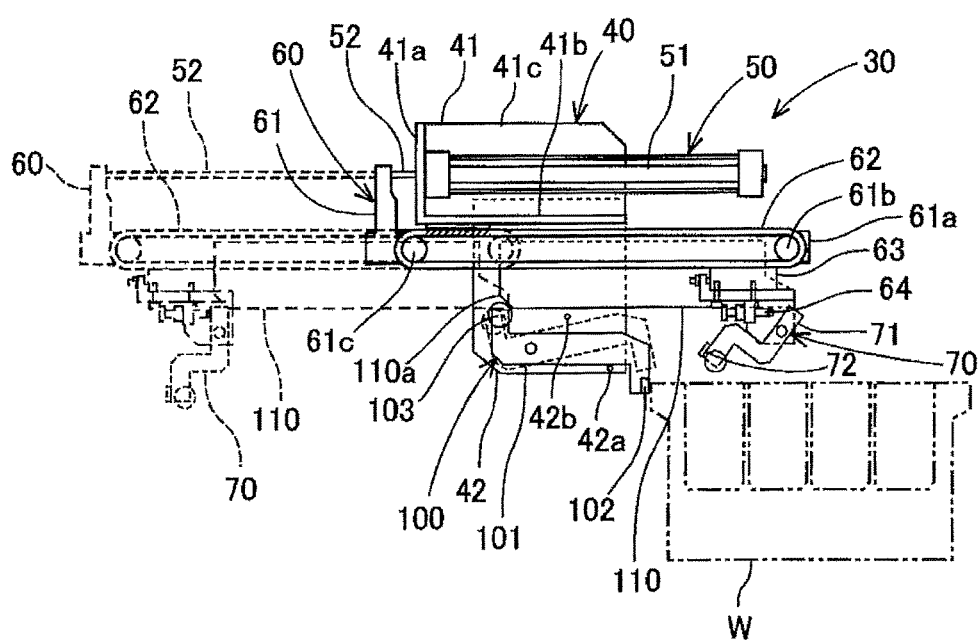
FIG. 2 is a front view of a second conveying device, showing a portion including a workpiece pressing member and an initial position stopper.

As shown in FIG. 2, the actuator 50 includes the actuator body 51 and the actuator moving part 52. The actuator body 51 is fixed to the first fixing member 41, and the actuator moving part 52 moves along the conveyance path 31 with respect to the actuator body 51. In the actuator 50 that is a cylinder device, the actuator moving part 52 serves as a cylinder rod. The actuator moving part 52 extends more downstream of the conveyance path 31 compared to the member 41a of the first fixing member 41.

The mobile body 60 is connected with the actuator moving part 52, and moves along the conveyance path 31 as the actuator moving part 52 moves. The mobile body 60 includes a first mobile body 61, a belt 62, a second mobile body 63, and an adjusting mechanism 64.

The first mobile body 61 is fixed to the actuator moving part 52. This means that the first mobile body 61 moves in the same way as the actuator moving part 52 does. The first mobile body 61 is fixed to a distal end of the actuator moving part 52, and includes a long portion 61a that is formed so as to be long in a moving direction of the actuator moving part 52. The first mobile body 61 further includes two pulleys 61b, 61c that are provided on both ends of the long portion 61a, respectively, so that the pulleys 61b, 61c are able to rotate.

The belt 62 is hanged on the two pulleys 61b, 61c. Also, a part of the belt 62 is fixed to the horizontal plate-shaped member 41b of the first fixing member 41. Therefore, the belt 62 rotates with respect to the first mobile body 61 as the actuator moving part 52 moves. To be specific, when the actuator moving part 52 moves in the conveyance direction, the belt 62 rotates in the clockwise direction in FIG. 2. Meanwhile, when the actuator moving part 52 moves in the opposite direction to the conveyance direction, the belt 62 rotates in the anticlockwise direction in FIG. 2.

The second mobile body 63 is fixed to a lower surface side of the belt 62. The second mobile body 63 moves along the conveyance path 31 as the belt 62 rotates. A moving distance of the second mobile body 63 is the sum total of a moving distance of the first mobile body 61, and a distance that the belt 62 moves along the conveyance path 31 as the belt 62 rotates. This means that the moving distance of the second mobile body 63 is twice as long as the moving distance of the first mobile body 61.

The adjusting mechanism 64 is provided in the second mobile body 63, and restricts a moving range of the workpiece pressing member 70. The adjusting mechanism 64 is able to adjust a position in the second mobile body 63 in a direction parallel to the conveyance path 31. This means that, due to adjustment made by the adjusting mechanism 64, the moving range of the workpiece pressing member 70 is adjusted.

The workpiece pressing member 70 is able to move along the conveyance path 31 as the second mobile body 63 moves. The workpiece pressing member 70 is provided in the second mobile body 63 so that the workpiece pressing member 70 is able to rotate. As the workpiece pressing member 70 rotates, the workpiece pressing member 70 switches between a state where the workpiece pressing member 70 is able to press the workpiece W, and a state where the workpiece pressing member 70 is able to avoid coming into contact with the workpiece W. As the workpiece pressing member 70 moves downstream of the conveyance path 31 in a state where the workpiece pressing member 70 presses the workpiece W, the workpiece pressing member 70 moves the workpiece W downstream of the conveyance path 31.

The workpiece pressing member 70 is formed into a shape that extends downstream and also downwardly with respect to a center of rotating of the workpiece pressing member 70 in the state where the workpiece pressing member 70 is able to press the workpiece W. A distal end of the workpiece pressing member 70 that extends downstream and also downwardly with respect to the center of rotating comes into contact with the workpiece W. In the state where the workpiece pressing member 70 is able to press the workpiece W, the workpiece pressing member 70 only need to rotate slightly so that the distal end of the workpiece pressing member 70 moves upwardly, and such that the workpiece pressing member 70 is changed to the state where contact with the workpiece W is avoided.

The workpiece pressing member 70 includes a workpiece pressing body 71 and a soft material 72. The workpiece pressing body 71 is provided in the second mobile body 63 so that the workpiece pressing body 71 is able to move. The soft material 72 is attached to the workpiece pressing body 71 in a detachable manner, formed from a material softer than the workpiece pressing body 71, and is provided in a portion that is able to come into contact with the workpiece W. The workpiece pressing body 71 is formed into a crank shape with the center of rotating that is adjacent to a first end of the crank shape. A second end of the crank shape is at a position that is more downstream and also lower than the center of rotating. In an upper end portion of the workpiece pressing body 71 above the center of rotating, a surface on the downstream side of the conveyance path 31 is able to come into contact with the adjusting mechanism 64.

The workpiece pressing body 71 is made from, for example, metal such as a steel material, and the soft material 72 is made from, for example, resin or rubber. Therefore, even when the soft material 72 comes into contact with the workpiece W, the soft material 72 is restrained from scratching the workpiece W. Further, since the soft material 72 is detachable, it is possible to easily replace the soft material 72 with a new one when the soft material 72 has wear or deterioration. It is preferred that the soft material 72 is disposed in a lower end of the workpiece pressing body 71 on a surface on the downstream side in the conveyance direction, a surface on the upstream side in the conveyance direction, and a lower surface. The soft material 72 may have various kinds of shapes such as a planar shape and a roller shape.

Figure 3:
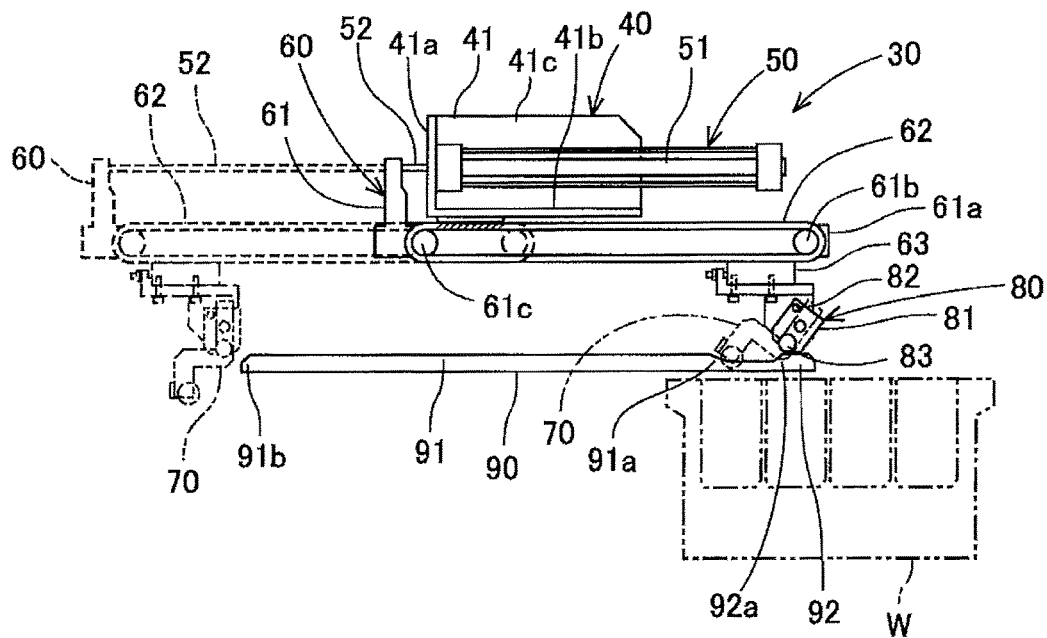
FIG. 3 is a front view of the second conveying device, showing a portion including a switching member.

As shown in FIG. 3 and FIG. 4, the switching member 80 is able to move along the conveyance path 31 when the second mobile body 63 moves. The switching member 80 switches between an engaged state and a non-engaged state with the workpiece pressing member 70 depending on a movement direction of the switching member 80 toward either downstream or upstream of the conveyance path 31.

In the embodiment, the switching member 80 is provided in the second mobile body 63 so that the switching member 80 is able to rotate coaxially with the center of rotating of the workpiece pressing member 70. A rotating direction of the switching member 80 changes depending on whether the switching member 80 moves downstream or upstream of the conveyance path 31. When the switching member 80 rotates in one direction, the switching member 80 is in the non-engaged state with the workpiece pressing member 70, and, when the switching member 80 rotates in the other direction, the switching member 80 is in the engaged state with the workpiece pressing member 70.

The switching member 80 includes a switching member body 81, an engaging member 82, and a roller 83. The switching member body 81 is formed into a plate shape and supported by the second mobile body 63 so that the switching member body 81 is able to rotate. The engaging member 82 is fixed to the switching member body 81 and engaged with the workpiece pressing member 70. The roller 83 is provided adjacent to a lower end of the switching member body 81 so that roller 83 is able to rotate.

The engaging member 82 is able to be engaged with a surface of the upper end portion of the workpiece pressing body 71 above the center of rotating, the surface being on the downstream side of the conveyance path 31. More specifically, the engaging member 82 is in the non-engaged state with the workpiece pressing member 70 in a reference state where the roller 83 is positioned lower than the center of rotating. Further, the engaging member 82 is also in the non-engaged state with the workpiece pressing member 70 in a state where the roller 83 is positioned on the upstream side of the conveyance path 31 with respect to the center of rotating. This means that, when the engaging member 82 rotates in the anticlockwise direction in FIG. 3, the engaging member 82 is in the non-engaged state. When the switching member 80 moves downstream of the conveyance path 31, the switching member 80 is in the non-engaged state with the workpiece pressing member 70. Therefore, the workpiece pressing member 70 is able to press the workpiece W.

Meanwhile, the engaging member 82 is in the engaged state with the workpiece pressing member 70 in a state where the roller 83 is at a position that is more downstream of the conveyance path 31 than the center of rotating. This means that, as shown in FIG. 3, the engaging member 82 is in the engaged state when the engaging member 82 rotates in the clockwise direction. When the switching member 80 moves upstream of the conveyance path 31, the switching member 80 is in the engaged state with the workpiece pressing member 70. Therefore, the workpiece pressing member 70 is able to avoid coming into contact with the workpiece W.

The guide member 90 is fixed to a lower end of the third fixing member 43, and is formed so as to extend along the conveyance path 31. The guide member 90 is slightly shorter than a distance in which the second mobile body 63 is able to move along the conveyance path 31. The guide member 90 includes a first guide 91 and a second guide 92.

The first guide 91 occupies the majority of the guide member 90 from an end portion of the guide member 90 on the downstream side of the conveyance path 31. As the first guide 91 is engaged with the switching member 80, the first guide 91 changes a rotating position of the switching member 80. More specifically, when the roller 83 rolls on the first guide 91, the switching member 80 takes a rotating position in the clockwise direction or the anticlockwise direction in FIG. 3 with respect to the reference state. Because the roller 83 is used, rolling resistance becomes small, reducing wear of the guide member 90.

In particular, as the switching member 80 is engaged with the first guide 91 while the switching member 80 moves downstream of the conveyance path 31, the switching member 80 rotates in the anticlockwise direction in FIG. 3 in the non-engaged state with the workpiece pressing member 70, allowing the workpiece pressing member 70 to press the workpiece W. Further, as the switching member 80 is engaged with the first guide 91 while the switching member 80 moves upstream of the conveyance path 31, the switching member 80 is in the engaged state with the workpiece pressing member 70, and rotates in the clockwise direction in FIG. 3 together with the workpiece pressing member 70, allowing the workpiece pressing member 70 to avoid coming into contact with the workpiece W.

The second guide 92 is disposed on the upstream side of the conveyance path 31 at a distance from an upstream end of the first guide 91. The second guide 92 is much shorter than the first guide 91. As the second guide 92 is engaged with the switching member 80, the rotating position of the switching member 80 is changed. More specifically, when the roller 83 rolls on the second guide 92, the switching member 80 is in a rotating position in the clockwise direction or the anticlockwise direction in FIG. 3 with respect to the reference state.

In particular, as the switching member 80 is engaged with the second guide 92 in an initial standby position, the switching member 80 is in the engaged state with the workpiece pressing member 70, allowing the workpiece pressing member 70 to avoid coming into contact with the workpiece W carried into the initial position on the conveyance path 31. Also, as the switching member 80 moves to a position between the first guide 91 and the second guide 92 from the state where the switching member 80 is engaged with the second guide 92, the workpiece pressing member 70 is enabled to press the workpiece W. Further, as the switching member 80 moves to a position between the first guide 91 and the second guide 92 from the state where the switching member 80 is engaged with the first guide 91, the switching member 80 is released from the engaged state with the workpiece pressing member 70.

Here, an upstream end and a downstream end of the first guide 91 include first guiding portions 91a, 91b, respectively. The first guiding portions 91a, 91b guide the switching member 80 to the state where the switching member 80 is engaged with the first guide 91 from the state where the switching member 80 is not engaged with the first guide 91. When the switching member 80 is changed to the state where the switching member 80 is engaged with the first guide 91, the first guiding portions 91a, 91b realize smooth movement of the switching member 80.

Further, a downstream end of the second guide 92 has a second guiding portion 92a. The second guiding portion 92a guides the switching member 80 to the state where the switching member 80 is engaged with the second guide 92 from the state where the switching member 80 is not engaged with the second guide 92. When the switching member 80 is changed to the state where the switching member 80 is engaged with the second guide 92, the second guiding portion 92a realizes smooth movement of the switching member 80.

As shown in FIG. 2, the initial position stopper 100 is provided in the second fixing member 42, and switches between a state where conveyance of the workpiece W carried into the initial position of the conveyance path 31 is restricted, and a state where conveyance of the workpiece W is permitted. More specifically, the initial position stopper 100 is provided in the second fixing member 42 so that the initial position stopper 100 is able to rotate. As the initial position stopper 100 rotates, the initial position stopper 100 switches between the state where conveyance of the workpiece W is restricted, and the state where conveyance of the workpiece W is permitted.

The initial position stopper 100 includes a stopper body 101, a soft material 102, and a roller 103. The stopper body 101 is a member provided in the second fixing member 42 so that the stopper body 101 is able to move. The stopper body 101 is formed into a crank shape. This means that the stopper body 101 has a portion projecting upwardly from an end portion of the stopper body 101 on the downstream side of the conveyance path 31, and also has a portion projecting downwardly from an end portion of the stopper body 101 on the upstream side of the conveyance path 31.

The stopper body 101 rotates about the center of rotating that is shifted downstream of the conveyance path 31 from a center of gravity of the initial position stopper 100. A rotating range of the stopper body 101 is restricted by two rotating restriction members 42a, 42b provided in the second fixing member 42.

The soft material 102 is formed from a material softer than the stopper body 101, and is attached to the stopper body 101 in a detachable manner. More specifically, the soft material 102 is attached to a surface of the portion of the stopper body 101 projecting downwardly, the surface being on the upstream side of the conveyance path 31. Thus, the soft material 102 is provided in an area that is able to come into contact with the workpiece W carried into the conveyance path 31.

The stopper body 101 is made from, for example, metal such as a steel material, and the soft material 102 is made from, for example, resin or rubber. Therefore, even when the soft material 102 comes into contact with the workpiece W, the soft material 102 is restrained from scratching the workpiece W. Also, since the soft material 102 is detachable, it is possible to replace the soft material 102 with a new one when the soft material 102 has wear or deterioration.

The roller 103 is provided in the upwardly-projecting portion of the stopper body 101 so that the roller 103 is able to rotate. The roller 103 rolls on the later-described stopper switching member 110 when the workpiece pressing member 70 moves at a position that is more downstream of the initial standby position. Because the roller 103 is used, rolling resistance is reduced, thereby reducing wear of the stopper switching member 110.

The stopper switching member 110 is fixed to a back surface of the long portion 61a so that the stopper switching member 110 hangs down from the long portion 61a. A lower surface of the stopper switching member 110 is formed into a planar shape that is parallel to a moving direction of the actuator moving part 52.

Thus, the stopper switching member 110 is able to move along the conveyance path 31 as the first mobile body 61 moves. The stopper switching member 110 switches a rotating position of the initial position stopper 100 when a state of the stopper switching member 110 switches between an engaged state and a non-engaged state with the roller 103 of the initial position stopper 100. In particular, the stopper switching member 110 switches the rotating position of the initial position stopper 100 depending on whether the workpiece pressing member 70 is at the initial standby position or the workpiece pressing member 70 is at a position on the more downstream side than the initial standby position.

More specifically, when the workpiece pressing member 70 is at the initial standby position, the stopper switching member 110 is in the non-engaged state with the roller 103 of the initial position stopper 100. Also, the initial position stopper 100 rotates about the center of rotating that is shifted from the center of gravity of the initial position stopper 100. Therefore, when the stopper switching member 110 is in the non-engaged state with the roller 103 of the initial position stopper 100, the initial position stopper 100 restricts conveyance of the workpiece W by using a weight of the initial position stopper 100 itself. Therefore, when the workpiece pressing member 70 is at the initial standby position, the stopper switching member 110 causes the initial position stopper 100 to restrict conveyance of the workpiece W.

Meanwhile, when the workpiece pressing member 70 is at a position that is more downstream than the initial standby position, the stopper switching member 110 is in the engaged state with the roller 103 of the initial position stopper 100. Therefore, when the workpiece pressing member 70 is at a position that is more downstream than the initial standby position, the stopper switching member 110 causes the initial position stopper 100 to permit conveyance of the workpiece W.

Further, the stopper switching member 110 includes a guiding portion 110a. The guiding portion 110a guides the stopper switching member 110 from the non-engaged state to the engaged state with the roller 103 of the initial position stopper 100. When the roller 103 of the initial position stopper 100 is changed to the engaged state with the stopper switching member 110, the guiding portion 110a realizes smooth movement of the initial position stopper 100.

3. Operation of Second Conveying Device 30

An operation of the second conveying device 30 and the conveyance method by the second conveying device 30 for the workpiece W are described with reference to FIG. 5 to FIG. 15. After the processed workpiece W is carried into the initial position on the conveyance path 31 from the processing machine 10 shown in FIG. 1, the second conveying device 30 conveys the processed workpiece W downstream of the conveyance path 31. The second conveying device 30 repeats this conveyance processing.

Specifically speaking, as the actuator 50 is driven, as shown in the uppermost stage in FIG. 5, the first mobile body 61 moves from the initial position that is the most upstream position to the most downstream position. Thereafter, as shown in the uppermost stage in FIG. 6, the first mobile body 61 returns to the initial position from the most downstream position.

3-1. Description of State of Each Member

Figure 7:
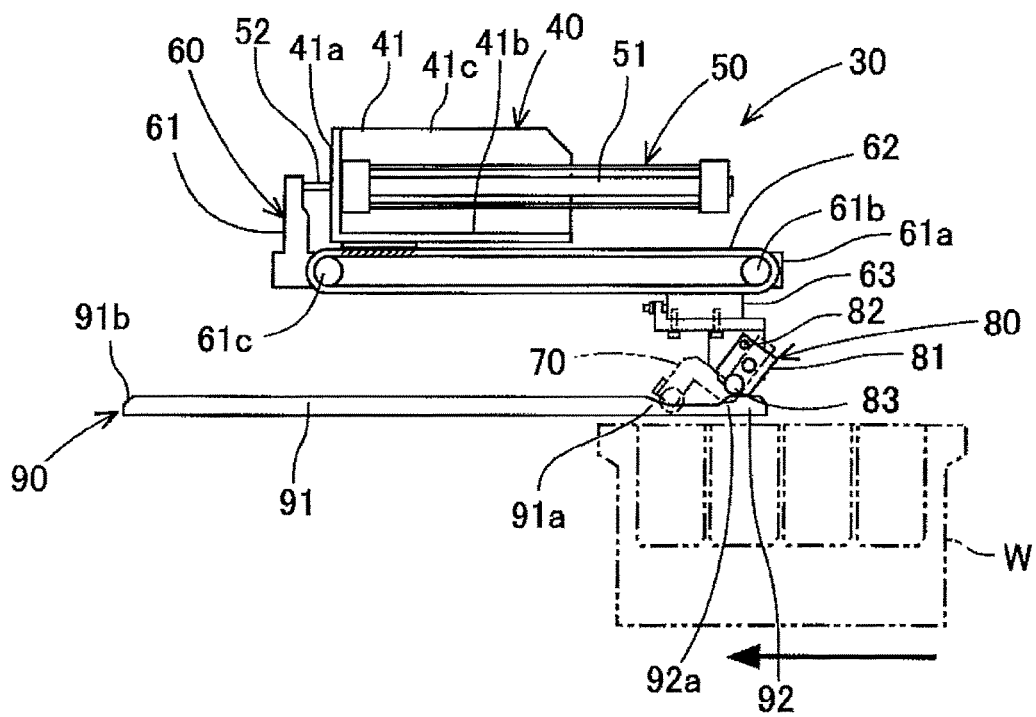
FIG. 7 is a view of a state of a portion of the second conveying device at time T1 in FIG. 5, the portion including the workpiece pressing member and the switching member.
Figure 9:
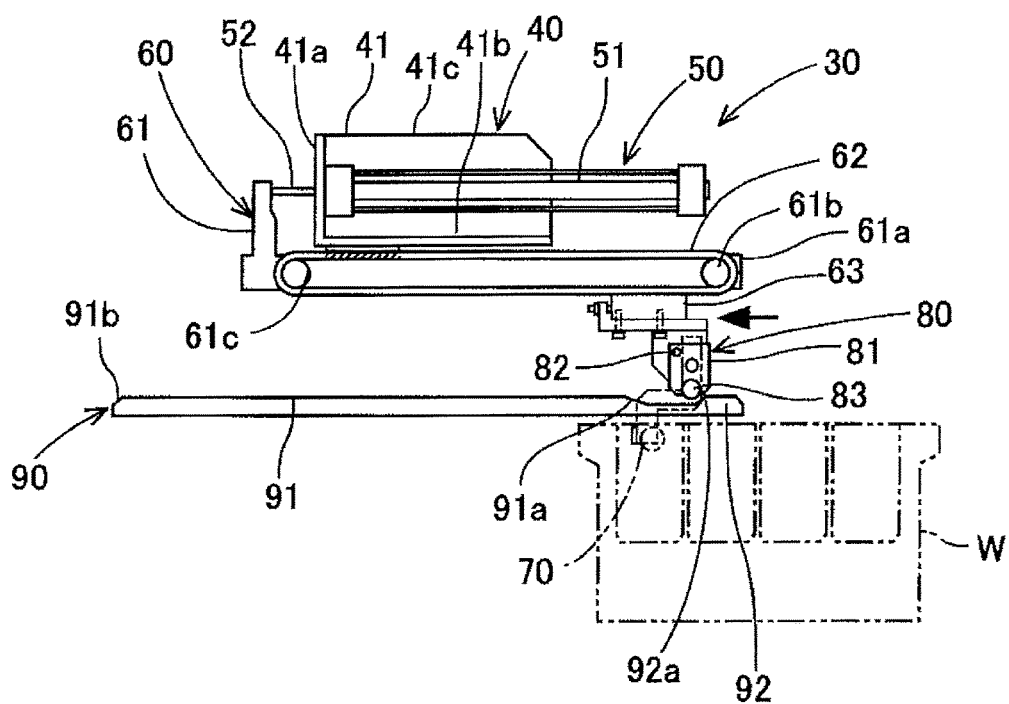
FIG. 9 is a view of a state of the portion of the second conveying device at time T2 in FIG. 5, the portion including the workpiece pressing member and the switching member.
Figure 11:
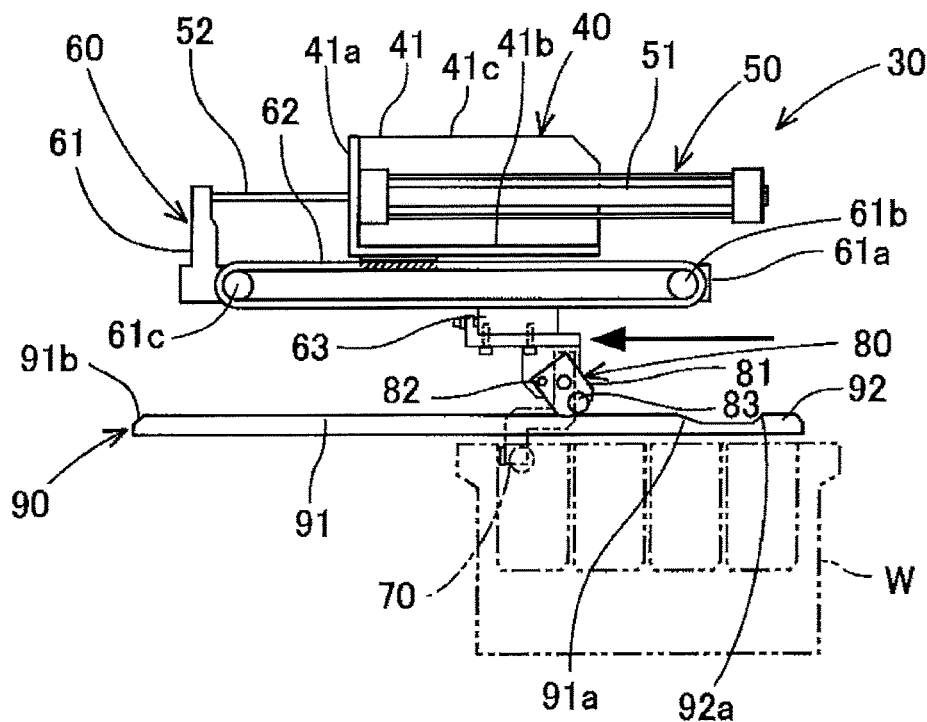
FIG. 11 is a view of a state of the portion of the second conveying device at time T3 in FIG. 5, the portion including the workpiece pressing member and the switching member.
Figure 13:
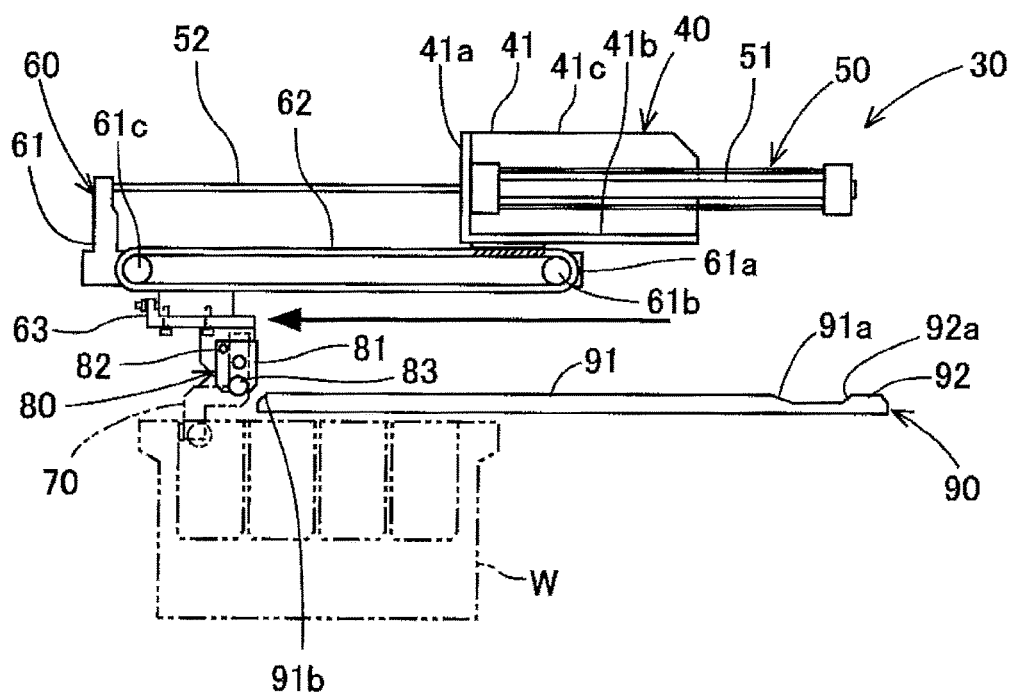
FIG. 13 is a view of a state of the portion of the second conveying device at time T4 in FIG. 5, the portion including the workpiece pressing member and the switching member.
Figure 15:
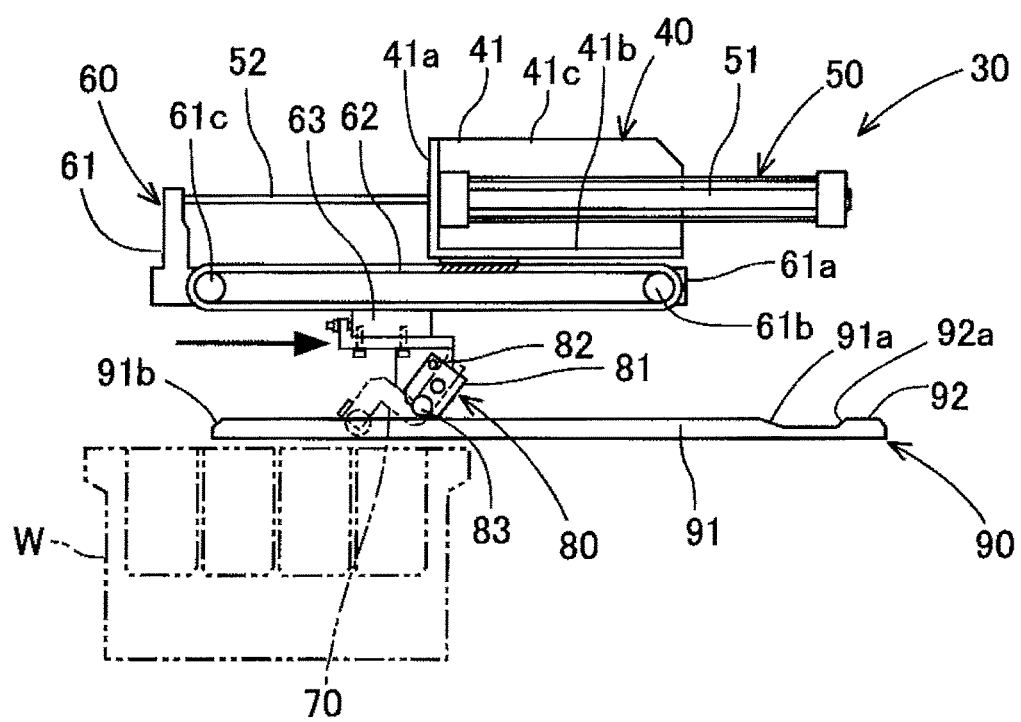
FIG. 15 is a view of a state of the portion of the second conveying device at time T6 in FIG. 6, the portion including the workpiece pressing member and the switching member.

A first state, a second state, and a third state of the switching member 80 in FIG. 5 and FIG. 6 are described as follows. As shown in FIG. 7 and FIG. 15, the first state of the switching member 80 is a state where the switching member 80 rotates in the clockwise direction in FIG. 7 and FIG. 15 in comparison to the reference state. This means that the roller 83 is at a position that is more downstream of the conveyance path 31 than the center of rotating, and the engaging member 82 is at a position that is more upstream than its position in the reference state. As shown in FIG. 9 and FIG. 13, the second state of the switching member 80 is a state where the switching member 80 is at a position in the reference state. This means that the roller 83 is positioned under the center of rotating. As shown in FIG. 11, the third state of the switching member 80 is a state where the switching member 80 rotates in the anticlockwise direction in FIG. 11 in comparison to the reference state. This means that the roller 83 is at a position that is more upstream of the conveyance path 31 than the center of rotating, and the engaging member 82 is at a position that is more downstream than its position in the reference state.

Further, a first state and a second state of the workpiece pressing member 70 in FIG. 5 and FIG. 6 are described as follows. As shown in FIG. 7 and FIG. 15, the first state of the workpiece pressing member 70 is a state where the workpiece pressing member 70 avoids coming into contact with the workpiece W. This means that, as shown in FIG. 7 and FIG. 15, the first state of the workpiece pressing member 70 is a state where the workpiece pressing member 70 rotates in the clockwise direction from the reference state, more specifically, a state where a lower end portion of the workpiece pressing member 70 is moved upwardly with respect to its position in the reference state. As shown in FIG. 9, FIG. 11, and FIG. 13, the second state of the workpiece pressing member 70 is a state where the workpiece pressing member 70 is able to press the workpiece W. This means that, as shown in FIG. 9, FIG. 11, and FIG. 13, the second state of the workpiece pressing member 70 is a state where the workpiece pressing member 70 is in a position in the reference state, more specifically, a state where the lower end portion of the workpiece pressing member 70 is positioned so as to be lower than the upper surface of the workpiece W.

Figure 8:
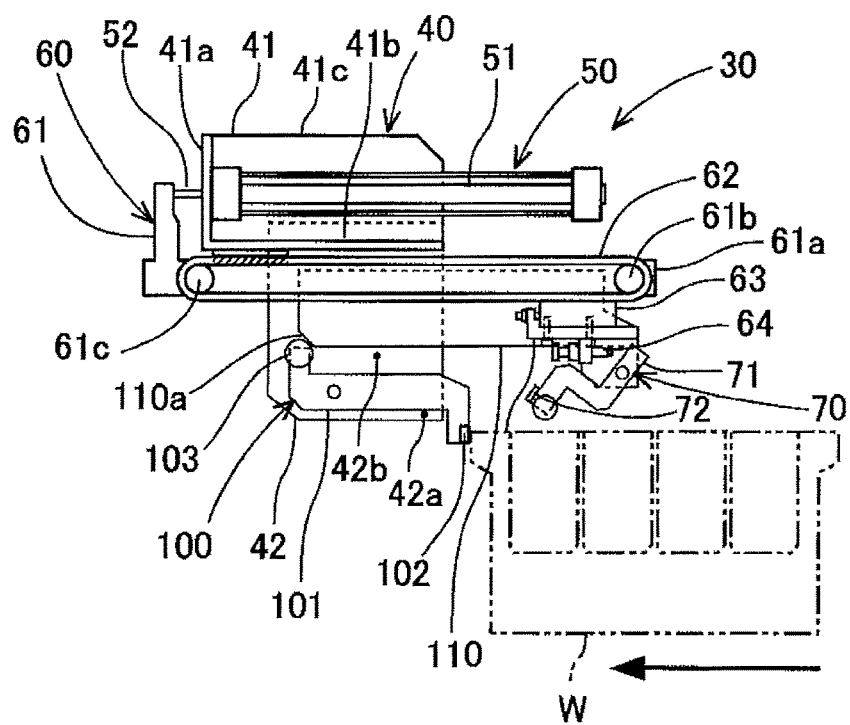
FIG. 8 is a view of a state of a portion of the second conveying device at time T1 in FIG. 5, the portion including the workpiece pressing member and the initial position stopper.
Figure 10:
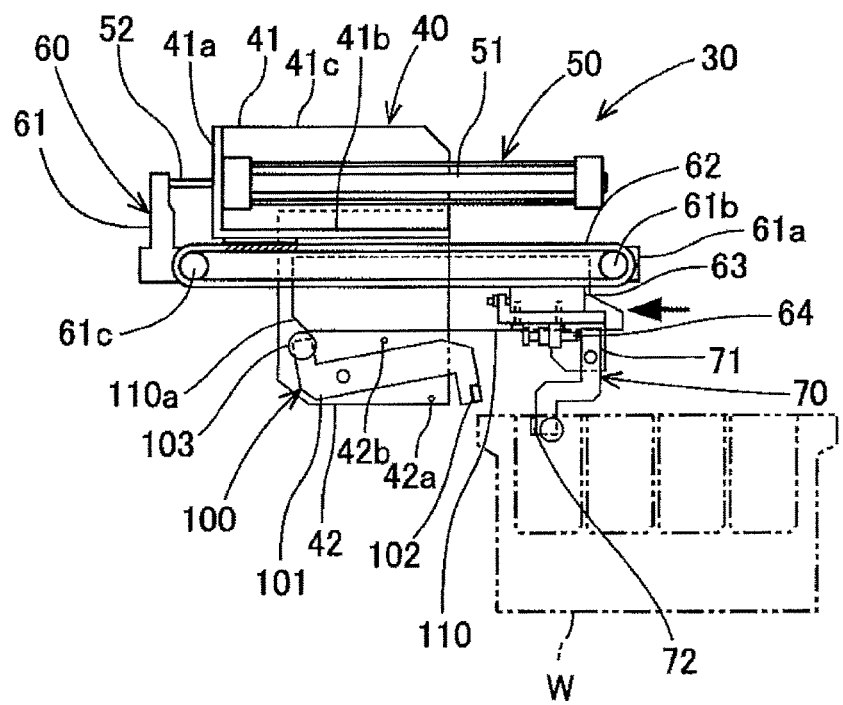
FIG. 10 is a view of a state of the portion of the second conveying device at time T2 in FIG. 5, the portion including the workpiece pressing member and the initial position stopper.
Figure 12:
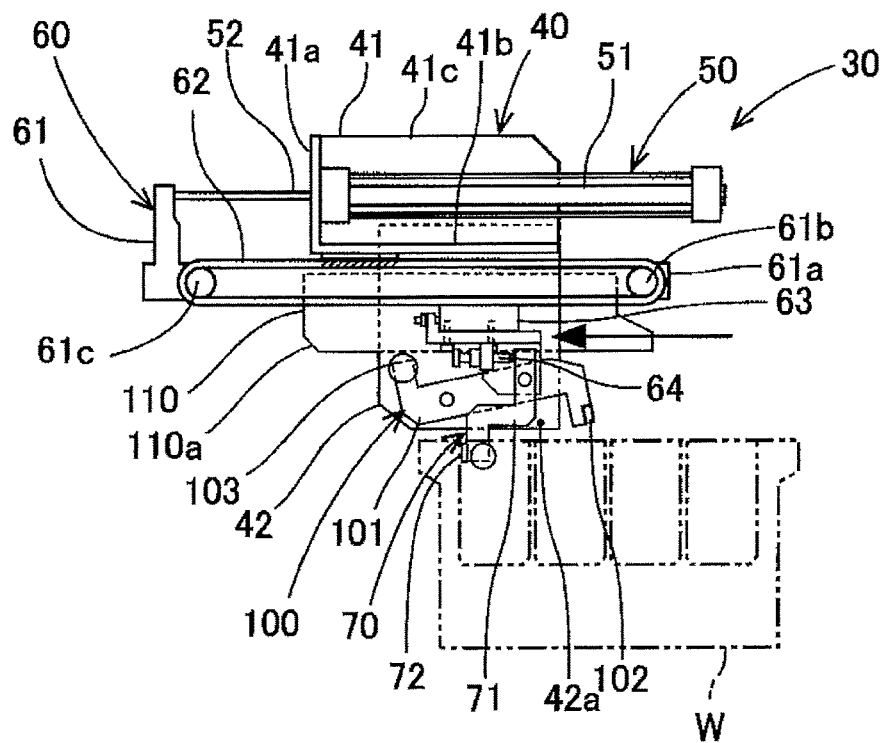
FIG. 12 is a view of a state of the portion of the second conveying device at time T3 in FIG. 5, the portion including the workpiece pressing member and the initial position stopper.
Figure 14:
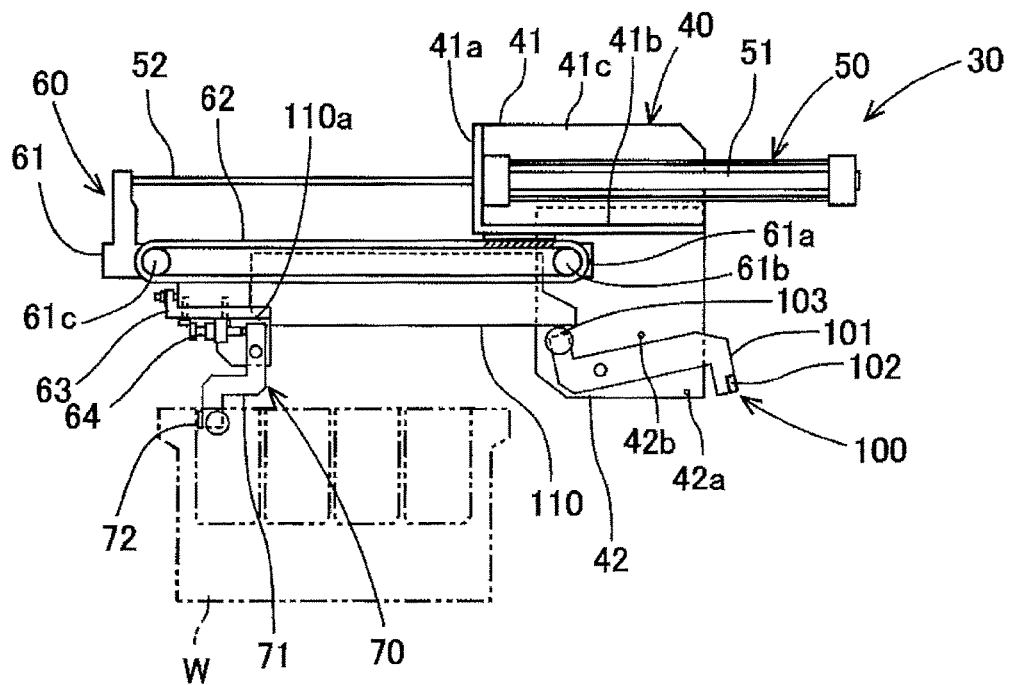
FIG. 14 is a view of a state of the portion of the second conveying device at time T4 in FIG. 5, the portion including the workpiece pressing member and the initial position stopper.

Also, a first state and a second state of the initial position stopper 100 in FIG. 5 and FIG. 6 are described as follows. As shown in FIG. 8, the first state of the initial position stopper 100 is a state where the initial position stopper 100 restricts conveyance of the workpiece W that has been carried in. Specifically, the first state of the initial position stopper 100 is a state where the initial position stopper 100 is at a position where the soft material 102 comes into contact with the workpiece W. As shown in FIG. 10, FIG. 12, and FIG. 14, the second state of the initial position stopper 100 is a state where the stopper body 101 rotates in the anticlockwise direction in the drawings, and avoids coming into contact with the workpiece W. This means that the second state of the initial position stopper 100 is a state where conveyance of the workpiece W on the conveyance path 31 is permitted.

3-2. When First Mobile Body Moves in Conveyance Direction

First of all, with reference to FIG. 5 and FIG. 7 to FIG. 14, description is given regarding a case where the first mobile body 61 moves from the initial position to the most downstream position. As shown in FIG. 7, at time T1 when the first mobile body 61 is at the initial position, the roller 83 of the switching member 80 is engaged with the second guide 92. Therefore, as shown in FIG. 7, the switching member 80 rotates in the clockwise direction with respect to the reference state (the first state of the switching member 80).

As shown in FIG. 7, when the switching member 80 is in the first state, the engaging member 82 of the switching member 80 is in the engaged state with the workpiece pressing member 70. Therefore, as shown in FIG. 7, at the standby position before the workpiece W is carried into the conveyance path 31 (the initial standby position), the workpiece pressing member 70 is in the state where contact with the workpiece W is avoided (the first state of the workpiece pressing member 70). Thus, the lower end of the workpiece pressing member 70 is positioned so as to be higher than the upper surface of the workpiece W to be carried in.

Further, at time T1 in FIG. 5, the stopper switching member 110 is at the most upstream position. At this time, as shown in FIG. 8, the roller 103 of the initial position stopper 100 is not engaged with the stopper switching member 110. Therefore, the initial position stopper 100 is restricted from changing its position by the rotating restriction member 42a on the lower side, and the soft material 102 of the initial position stopper 100 is in a state where the soft material 102 is able to come into contact with the workpiece W that is carried in (the first state of the initial position stopper 100). Here, due to the rollers 31a of the conveyance path 31, force for moving downstream of the conveyance path 31 is applied to the workpiece W that has been carried into the conveyance path 31. However, the initial position stopper 100 restricts conveyance of the workpiece W against such force. Thus, the workpiece W is positioned at the position where the workpiece W is carried in.

Next, as shown in FIG. 9, at time T2 in FIG. 5 when the first mobile body 61 moves downstream from the initial position, the roller 83 of the switching member 80 is positioned between the first guide 91 and the second guide 92. Therefore, the roller 83 is engaged with neither the first guide 91 nor the second guide 92. Accordingly, as shown in FIG. 9, the switching member 80 is in the reference state (the second state of the switching member 80).

Then, as shown in FIG. 9, the engaging member 82 of the switching member 80 is in the non-engaged state with the workpiece pressing member 70. Therefore, as shown in FIG. 9, the workpiece pressing member 70 is restricted from rotating as the workpiece pressing member 70 comes into contact with the adjusting mechanism 64. At this time, the lower end of the workpiece pressing member 70 is positioned so as to be lower than the upper surface of the workpiece W. Also, in the embodiment, the workpiece pressing member 70 enters a bore of the workpiece W without coming into contact with the workpiece W that is a cylinder block. Specifically, the soft material 72 of the workpiece pressing member 70 faces an inner peripheral surface of the bore. Depending on a type of the workpiece W, the workpiece pressing member 70 may face an end surface of the workpiece W on the upstream side of the conveyance path 31.

When the roller 83 of the switching member 80 changes from the state where the roller 83 is engaged with the second guide 92 to the state where the roller 83 is not engaged with the second guide 92, the second guiding portion 92a of the second guide 92 realizes smooth position changes of the switching member 80 and the workpiece pressing member 70.

Further, as shown in FIG. 10, at time T2 in FIG. 5, the stopper switching member 110 moves together with the first mobile body 61. Therefore, the roller 103 of the initial position stopper 100 is engaged with the stopper switching member 110. Hence, the initial position stopper 100 rotates in the anticlockwise direction in FIG. 10, and is thus able to avoid coming into contact with the workpiece W (the second state of the initial position stopper 100). In particular, because the roller 103 of the initial position stopper 100 is at a position that is more upstream and lower than the center of rotating of the initial position stopper 100, the initial position stopper 100 is able to avoid coming into contact with the workpiece W by rotating slightly.

When the roller 103 of the initial position stopper 100 changes from the state where the roller 103 is not engaged with the stopper switching member 110 to the state where the roller 103 is engaged with the stopper switching member 110, the guiding portion 110a of the stopper switching member 110 realizes a smooth position change of the initial position stopper 100.

Next, as shown in FIG. 11, at time T3 in FIG. 5 when the first mobile body 61 moves further downstream, the roller 83 of the switching member 80 is engaged with the first guide 91. At this time, the roller 83 of the switching member 80 moves backward in the moving direction with respect to the center of rotating of the switching member 80, in other words, upstream of the conveyance path 31. Thus, as shown in FIG. 11, the switching member 80 is in the state where the switching member 80 rotates in the anticlockwise direction with respect to the reference state (the third state of the switching member 80).

Here, when the roller 83 of the switching member 80 changes from the state where the roller 83 is positioned between the first guide 91 and the second guide 92 to the state where the roller 83 is engaged with the first guide 91, the first guiding portion 91a of the first guide 91 realizes a smooth position change of the switching member 80.

As shown in FIG. 11, when the switching member 80 is in the third state, the engaging member 82 of the switching member 80 is in the non-engaged state with the workpiece pressing member 70. This means that only the switching member 80 rotates, and the workpiece pressing member 70 is in the reference state. The workpiece pressing member 70 is restricted by the adjusting mechanism 64 from rotating in the anticlockwise direction in FIG. 12. Therefore, the workpiece pressing member 70 is able to press the workpiece W towards the downstream side of the conveyance path 31. In this way, while the roller 83 of the switching member 80 is engaged with the first guide 91, the workpiece pressing member 70 is able to move the workpiece W downstream of the conveyance path 31 in the state where the workpiece pressing member 70 presses the workpiece W.

Meanwhile, the roller 103 of the initial position stopper 100 continues to be engaged with the stopper switching member 110. Therefore, as shown in FIG. 12, the initial position stopper 100 avoids coming into contact with the workpiece W that is being conveyed, thus permitting conveyance of the workpiece W.

Next, as shown in FIG. 13, at time T4 in FIG. 5 when the first mobile body 61 moves even further downstream, the roller 83 of the switching member 80 is not engaged with the first guide 91. Therefore, as shown in FIG. 13, the switching member 80 is in the reference state (the second state of the switching member 80). When the roller 83 of the switching member 80 changes from the state where the roller 83 is engaged with the first guide 91 to the state where the roller 83 is not engaged with the first guide 91, the first guiding portion 91b of the first guide 91 realizes a smooth position change of the switching member 80.

Then, as shown in FIG. 14, while the engaging member 82 of the switching member 80 rotates around the center of rotating of the switching member 80, the engaging member 82 remains in the non-engaged state with the workpiece pressing member 70. Therefore, as shown in FIG. 14, even after the engaging member 82 of the switching member 80 is no longer engaged with the first guide 91, the workpiece pressing member 70 is still able to move the workpiece W downstream of the conveyance path 31 in the state where the workpiece pressing member 70 presses the workpiece W. In this way, at time T4 in FIG. 5, the second conveying device 30 is able to convey the workpiece W to a given position.

Meanwhile, the roller 103 of the initial position stopper 100 remains in the engaged state with the stopper switching member 110. Therefore, as shown in FIG. 14, the initial position stopper 100 remains in the position that avoids coming into contact with the workpiece W that is being conveyed, thus permitting conveyance of the workpiece W.

3-3. When First Mobile Body Returns to Opposite Side of Conveyance Direction

Next, with reference to FIG. 6 to FIG. 10 and FIG. 13 to FIG. 15, description is given regarding a case where the first mobile body 61 returns to the initial position from the most downstream position. States of the respective parts of the second conveying device 30 at time T5 in FIG. 6 is the same as those at time T4 in FIG. 5. This means that the second conveying device 30 is in the state shown in FIG. 13 and FIG. 14. From this state, the first mobile body 61 returns to the initial position.

Next, as shown in FIG. 15, at time T6 in FIG. 6 when the first mobile body 61 moves upstream, the roller 83 of the switching member 80 is engaged with the first guide 91. At this time, the roller 83 of the switching member 80 moves backward in a moving direction with respect to the center of rotating of the switching member 80, in other words, downstream of the conveyance path 31. This means that, as shown in FIG. 15, the switching member 80 rotates in the clockwise direction with respect to the reference state (the first state of the switching member 80). Here, the state of the switching member 80 is different from the case where the first mobile body 61 moves downstream of the conveyance path 31 as shown in FIG. 11.

As shown in FIG. 15, when the switching member 80 is in the first state, the engaging member 82 of the switching member 80 is in the engaged state with the workpiece pressing member 70. Therefore, as shown in FIG. 15, the workpiece pressing member 70 is in the state where contact with the conveyed workpiece W is avoided (the first state of the workpiece pressing member 70). Specifically, the lower end of the workpiece pressing member 70 is positioned so as to be higher than the upper surface of the workpiece W carried in.

When the roller 83 of the switching member 80 changes from the state where the roller 83 is not engaged with the first guide 91 to the state where the roller 83 is engaged with the first guide 91, the first guiding portion 91b of the first guide 91 realizes smooth position changes of the switching member 80 and the workpiece pressing member 70.

Meanwhile, the roller 103 of the initial position stopper 100 remains in the engaged state with the stopper switching member 110. Therefore, as shown in FIG. 14, the initial position stopper 100 remains in the position where contact with the conveyed workpiece W is avoided, thus permitting conveyance of the workpiece W.

Next, at time T7 in FIG. 6 when the first mobile body 61 moves further upstream, the second conveying device 30 is in the state shown in FIG. 9 and FIG. 10. Specifically, the switching member 80 is in the reference state (the second state of the switching member 80). Then, the engaging member 82 of the switching member 80 is in the non-engaged state with the workpiece pressing member 70. Therefore, the workpiece pressing member 70 is positioned so as to be lower than the upper surface of the workpiece W. However, in this case, there is no workpiece W at a position of the workpiece pressing member 70. Thus, the workpiece pressing member 70 does not come into contact with the workpiece W.

When the roller 83 of the switching member 80 changes from the state where the roller 83 is engaged with the first guide 91 to the state where the roller 83 is not engaged with the first guide 91, the first guiding portion 91a of the first guide 91 realizes smooth position changes of the switching member 80 and the workpiece pressing member 70.

Next, at time T8 in FIG. 6 when the first mobile body 61 moves to the initial position that is further more upstream, the second conveying device 30 is in the state shown in FIG. 7 and FIG. 8. Specifically, as the roller 83 of the switching member 80 is engaged with the second guide 92, the switching member 80 rotates in the clockwise direction in FIG. 7 with respect to the reference state (the first state of the switching member 80). Then, since the engaging member 82 of the switching member 80 is in the engaged state with the workpiece pressing member 70, the workpiece pressing member 70 is in the state where contact with the workpiece W is avoided (the first state of the workpiece pressing member 70) at the initial standby position.

Here, when the roller 83 of the switching member 80 changes from the state where the roller 83 is engaged with neither the first guide 91 nor the second guide 92 to the state where the roller 83 is engaged with the second guide 92, the second guiding portion 92a of the second guide 92 realizes smooth position changes of the switching member 80 and the workpiece pressing member 70.

In this case, as shown in FIG. 8, the roller 103 of the initial position stopper 100 is not engaged with the stopper switching member 110. Therefore, the initial position stopper 100 is restricted from changing its position by the rotating restriction member 42a on the lower side, and the soft material 102 of the initial position stopper 100 is thus able to come into contact with the workpiece W carried in (the first state of the initial position stopper 100).

4. Effects

When the switching member 80 of the second conveying device 30 moves downstream of the conveyance path 31, the switching member 80 is in the engaged state with the workpiece pressing member 70. Thus, the workpiece pressing member 70 is able to press the workpiece W. On the other hand, when the switching member 80 moves upstream of the conveyance path 31, the switching member 80 is in the non-engaged state with the workpiece pressing member 70. Therefore, the workpiece pressing member 70 is in the state where contact with the workpiece W is avoidable.

Because of the operation of the switching member 80, the workpiece pressing member 70 switches between the state where the workpiece pressing member 70 is able to press the workpiece W, and the state where the workpiece pressing member 70 is able to avoid coming into contact with the workpiece W. Then, the operation of the switching member 80 is performed by the actuator 50 that causes the workpiece pressing member 70 to move along the conveyance path 31 in order to convey the workpiece W. This means that the actuator 50 causes the workpiece pressing member 70 to move in order to convey the workpiece W, and, at the same time, the actuator 50 operates the switching member 80 in order for the workpiece pressing member 70 to avoid coming into contact with the workpiece W.

Therefore, the actuator 50 is used not only to cause the workpiece pressing member 70 to avoid coming into contact with the workpiece W, but also to convey the workpiece W. Therefore, the second conveying device 30 does not have more than one actuators, thus reducing cost. Also, since the actuator 50 is used for more than one purpose, the problem caused by use of a plurality of cylinder devices and motors does not happen.

Moreover, the initial position stopper 100 of the second conveying device 30 switches between the state where conveyance of the workpiece W carried into the initial position of the conveyance path 31 is restricted, and the state where conveyance of the workpiece W is permitted. The initial position stopper 100 switches the states by using the stopper switching member 110. Here, the stopper switching member 110 moves as the first mobile body 61 moves, and the first mobile body 61 is moved by drive of the actuator 50. This means that the switching operation of the initial position stopper 100 is performed by the actuator 50. Hence, the initial position stopper 100 is able to reliably realize the state where the workpiece W carried into the initial position is restricted, and the state where conveyance of the workpiece W is permitted.

Moreover, the actuator 50 also serves as an actuator that moves the workpiece pressing member 70 along the conveyance path 31. This means that the actuator 50 is used not only to operate the initial position stopper 100, but also to move the workpiece pressing member 70. Since an actuator for a single purpose is not provided in the second conveying device 30, a cost reduction is realized.

5. Modifications

In the embodiment described above, when the switching member 80 is in the engaged state with the workpiece pressing member 70, the workpiece pressing member 70 is able to avoid coming into contact with the workpiece W, and when the switching member 80 is in the non-engaged state with the workpiece pressing member 70, the workpiece pressing member 70 is able to press the workpiece W. Alternatively, the workpiece pressing member 70 may be able to press the workpiece W in the engaged state, and the workpiece pressing member 70 may be able to avoid coming into contact with the workpiece W in the non-engaged state.

In the embodiment described above, the workpiece pressing member 70 is provided in the second mobile body 63 so that the workpiece pressing member 70 is able to rotate. However, by providing the workpiece pressing member 70 in the second mobile body 63 so that the workpiece pressing member 70 is able to move linearly, the workpiece pressing member 70 may switch between the state where the workpiece pressing member 70 is able to avoid coming into contact with the workpiece W, and the state where the workpiece pressing member 70 is able to press the workpiece W. In this case, the switching member 80 may move linearly instead of rotating.

Further, in the embodiment described above, when the initial position stopper 100 is in the non-engaged state with the stopper switching member 110, conveyance of the workpiece W is restricted, and, when the initial position stopper 100 is in the engaged state with the stopper switching member 110, conveyance of the workpiece W is permitted. Alternatively, the initial position stopper 100 may permit conveyance of the workpiece W in the non-engaged state, and, the initial position stopper 100 may restrict conveyance of the workpiece W in the engaged state.

Furthermore, in the embodiment described above, the initial position stopper 100 is provided in the first mobile body 61 so that the initial position stopper 100 is able to rotate. However, the initial position stopper 100 also may be provide in the first mobile body 61 so that the initial position stopper 100 is able to move linearly, such that state of the initial position stopper 100 can be changed between the state where conveyance of the workpiece W is restricted, and the state where conveyance of the workpiece W is permitted.

What is claimed is:

1. A conveying device comprising:
   an actuator;
   a mobile body that moves along a conveyance path by drive of the actuator;
   a workpiece pressing member that is able to move along the conveyance path when the mobile body moves, the workpiece pressing member moving a workpiece by moving along the conveyance path in a state where the workpiece pressing member presses the workpiece;
   a switching member that moves along the conveyance path when the mobile body moves, the switching member switching a relation between a position of the workpiece pressing member and a position of the switching member such that the relation becomes a first relation or a second relation depending on a moving direction of the mobile body;
   a first guide that is fixed along the conveyance path, and engaged with the switching member so as to change a rotating position of the switching member, wherein
   the relation becomes one of the first relation and the second relation when the switching member moves along the first guide in a first direction in the conveyance path, and thus realizes a first state in which the workpiece pressing member is able to press the workpiece; and
   the relation becomes another one of the first relation and the second relation when the switching member moves along the first guide in a second direction in the conveyance path, and thus realizes a second state in which the workpiece pressing member is able to avoid coming into contact with the workpiece.

2. The conveying device according to claim 1, wherein:
the workpiece pressing member is provided in the mobile body so that the workpiece pressing member is able to rotate;
the workpiece pressing member switches between the first state and the second state when the workpiece pressing member rotates;
the switching member is provided in the mobile body so that the switching member is able to rotate;
the switching member rotates in different directions in accordance with the moving direction of the mobile body;
when the switching member rotates in a first rotating direction, the relation is the first relation; and
when the switching member rotates in a second rotating direction, the relation is the second relation.

3. The conveying device according to claim 2, wherein:
the workpiece pressing member is formed into a shape that extends in the first direction in the conveyance path and also downwardly with respect to a rotating center of the workpiece pressing member in the first state;
a distal end of the workpiece pressing member comes into contact with the workpiece;
the distal end extends in the first direction in the conveyance path and also downwardly with respect to the rotating center; and
the workpiece pressing member is changed to the second state when the workpiece pressing member rotates from the first state so that the distal end moves upwardly.

4. The conveying device according to claim 2, wherein:
the switching member rotates in the first rotating direction when the switching member is engaged with the first guide and moves in the first direction in the conveyance path; and
the switching member rotates in the second rotating direction when the switching member is engaged with the first guide and moves in the second direction in the conveyance path.

5. The conveying device according to claim 4, wherein the switching member includes a roller that rolls on the first guide when the switching member is engaged with the first guide.

6. The conveying device according to claim 4, wherein:
at least one of two end portions of the first guide includes a first guiding portion; and
the first guiding portion guides the switching member from a state where the switching member is not engaged with the first guide to a state where the switching member is engaged with the first guide.

7. The conveying device according to claim 4, further comprising a second guide that is disposed at a predetermined distance from a first end of the first guide in the first direction or the second direction in the conveyance path, the second guide changing the rotating position of the switching member when the second guide is engaged with the switching member, wherein:
the relation becomes the second relation when the switching member is engaged with the second guide at an initial standby position; and
the relation becomes the first relation when the switching member moves to a position between the first guide and the second guide from the state where the switching member is engaged with the first guide.

8. The conveying device according to claim 7, wherein:
a first end of the second guide on a first guide side includes a second guiding portion; and
the second guiding portion guides the switching member from a state where the switching member is not engaged with the second guide to a state where the switching member is engaged with the second guide.

9. The conveying device according to claim 1, wherein the workpiece pressing member includes:
a workpiece pressing body provided in the mobile body such that the workpiece pressing body is able to move; and
a soft material that is attached to the workpiece pressing body in a detachable manner, the soft material being made from a material softer than the workpiece pressing body, the soft material being provided in a portion that is able to come into contact with the workpiece.

10. The conveying device according to claim 1, further comprising:
a fixing member that is provided in the conveyance path in a fixed manner; an initial position stopper that is provided in the fixing member and switches between a state where conveyance of the workpiece carried into an initial position in the conveyance path is restricted, and a state where conveyance of the workpiece is permitted; and
a stopper switching member that is able to move along the conveyance path when the mobile body moves, the stopper switching member causing the initial position stopper to be in a restricted state in which conveyance of the workpiece is restricted when the workpiece pressing member is at an initial standby position, the stopper switching member causing the initial position stopper to be in a permitted state in which conveyance of the workpiece is permitted when the workpiece pressing member is at a position that is more downstream than the initial standby position.

11. The conveying device according to claim 1, wherein:
when the relation is the first relation, the workpiece pressing member and the switching member are not engaged with each other; and
when the relation is the second relation, the workpiece pressing member and the switching member are engaged with each other.

12. The conveying device according to claim 1, wherein:
when the relation is the first relation, the workpiece pressing member is in the first state; and
when the relation is the second relation, the workpiece pressing member is in the second state.

13. A conveying device comprising:
an actuator;
a mobile body that moves along a conveyance path due to drive of the actuator;
a workpiece pressing member that is able to move along the conveyance path when the mobile body moves, the workpiece pressing member moving along the conveyance path in a state where the workpiece pressing member presses a workpiece, and thus moving the workpiece;
a fixing member provided in the conveyance path in a fixed manner;
an initial position stopper that is provided in the fixing member and switches between a restricted state where conveyance of the workpiece carried into an initial position in the conveyance path is restricted, and a permitted state where conveyance of the workpiece is permitted; and a stopper switching member that is able to move along the conveyance path when the mobile body moves, the stopper switching member causing the initial position stopper to be in the restricted state when the workpiece pressing member is at an initial standby position, the stopper switching member causing the initial position stopper to be in the permitted state when the workpiece pressing member is at a position that is more downstream than the initial standby position, wherein:
the initial position stopper is provided in the fixing member so that the initial position stopper is able to rotate;
the initial position stopper switches between the restricted state and the permitted state when the initial position stopper rotates; and
the stopper switching member switches a rotating position of the initial position stopper depending on whether or not the workpiece pressing member passes a predetermined position.

14. The conveying device according to claim 13, wherein:
the stopper switching member is in a non-engaged state where the stopper switching member is not engaged with the initial position stopper when the workpiece pressing member is at the initial standby position;
the stopper switching member is in a engaged state where the stopper switching member is engaged with the initial position stopper when the workpiece pressing member passes the predetermined position; and
the stopper switching member includes a guiding portion that guides the stopper switching member from the non-engaged state to the engaged state.

15. The conveying device according to claim 13, wherein the initial position stopper includes a roller that rolls on the stopper switching member when the workpiece pressing member moves from the initial standby position in a direction in which the workpiece is conveyed.

16. The conveying device according to claim 13, wherein:
the initial position stopper rotates about a rotating center that is shifted from a center of gravity of the initial position stopper; and
the initial position stopper is in the restricted state due to a weight of the initial position stopper itself when the stopper switching member is in a non-engaged state where the stopper switching member is not engaged with the initial position stopper.

17. A conveying device comprising:
an actuator;
a mobile body that moves along a conveyance path due to drive of the actuator;
a workpiece pressing member that is able to move along the conveyance path when the mobile body moves, the workpiece pressing member moving along the conveyance path in a state where the workpiece pressing member presses a workpiece, and thus moving the workpiece;
a fixing member provided in the conveyance path in a fixed manner;
an initial position stopper that is provided in the fixing member and switches between a restricted state where conveyance of the workpiece carried into an initial position in the conveyance path is restricted, and a permitted state where conveyance of the workpiece is permitted; and
a stopper switching member that is able to move along the conveyance path when the mobile body moves, the stopper switching member causing the initial position stopper to be in the restricted state when the workpiece pressing member is at an initial standby position, the stopper switching member causing the initial position stopper to be in the permitted state when the workpiece pressing member is at a position that is more downstream than the initial standby position,
wherein the initial position stopper includes:
a stopper body that is provided in the fixing member so that the stopper body is able to move; and
a soft material that is attached to the stopper body in a detachable manner, the soft material being made from a material softer than the stopper body, the soft material being provided in an area that is able to come into contact with the workpiece.

* * * * *